United States Patent
Davis et al.

(10) Patent No.: US 6,703,127 B2
(45) Date of Patent: Mar. 9, 2004

(54) MACROCAPSULES CONTAINING MICROENCAPSULATED PHASE CHANGE MATERIALS

(75) Inventors: Danny Allen Davis, Casstown, OH (US); Ronald Lee Hart, Xenia, OH (US); Dale Ellis Work, London, OH (US); David Russell Virgallito, Centerville, OH (US)

(73) Assignee: Microtek Laboratories, Inc., Dayton, OH (US)

( * ) Notice: Subject to any disclaimer, the term of this patent is extended or adjusted under 35 U.S.C. 154(b) by 116 days.

(21) Appl. No.: 09/964,777

(22) Filed: Sep. 27, 2001

(65) Prior Publication Data

US 2002/0061954 A1 May 23, 2002

Related U.S. Application Data

(60) Provisional application No. 60/235,850, filed on Sep. 27, 2000.

(51) Int. Cl.$^7$ .................... B32B 15/02; B32B 17/02; B32B 19/00; B32B 21/02; B32B 27/02
(52) U.S. Cl. ................ 428/402.2; 428/402.21; 428/402.24; 428/403
(58) Field of Search ............ 428/402.2, 402.21, 428/402.24, 403

(56) References Cited

U.S. PATENT DOCUMENTS

| | | |
|---|---|---|
| 4,352,883 A | 10/1982 | Lim |
| 4,504,402 A | 3/1985 | Chen et al. |
| 4,756,958 A | 7/1988 | Bryant et al. |
| 4,807,696 A | 2/1989 | Colvin et al. |
| 4,911,232 A | 3/1990 | Colvin et al. |
| 5,141,079 A | 8/1992 | Whitney et al. |
| 5,224,356 A | 7/1993 | Colvin et al. |
| 5,290,904 A | 3/1994 | Colvin et al. |
| 5,366,801 A | 11/1994 | Bryant et al. |
| 5,415,222 A | 5/1995 | Colvin et al. |
| 5,722,482 A | 3/1998 | Buckley |
| 5,885,475 A | 3/1999 | Salyer |

*Primary Examiner*—Nathan M. Nutter
(74) *Attorney, Agent, or Firm*—Thompson Hine LLP

(57) ABSTRACT

The present invention is directed to thermal energy storage compositions comprising macrocapsules containing therein a plurality of microcapsules and to methods for producing macrocapsules containing microcapsules. In accordance with some embodiments of the present invention, the microcapsules contain a phase change material.

13 Claims, No Drawings

MACROCAPSULES CONTAINING MICROENCAPSULATED PHASE CHANGE MATERIALS

CROSS-REFERENCE TO RELATED APPLICATION

The present application claims priority from U.S. provisional application Ser. No. 60/235,850, filed Sep. 27, 2000.

BACKGROUND OF THE INVENTION

The present invention relates to thermal energy storage compositions comprising macrocapsules or beads containing phase change materials (PCMs) and, more particularly, to macrocapsules containing microencapsulated phase change materials. Although the focus of the present application is directed to encapsulation of phase change materials, the procedure described herein can also be used to encapsulate a variety of materials, such as fragrances, pharmaceuticals, pesticides, oils, lubricants, and the like.

U.S. Pat. No. 5,415,222 to Colvin, et al. discloses a cooling garment, preferably in the form of a vest that contains pouches containing a phase change material. In one embodiment the cooling garment includes a honeycomb structure which is contained within the pouches and which contains a macroencapsulated phase change material and allows the escape of perspiration through the garment. The cooling garments are designed to permit evaporative cooling to occur and to contribute to the overall comfort of the wearer.

U.S. Pat. No. 5,290,904 to Colvin, et al. discloses a thermal shield which may include a phase change material in bulk, micro or macro encapsulated to provide enhanced thermal protection.

U.S. Pat. No. 4,911,232 to Colvin, et al. and U.S. Pat. No. 5,007,478 to Sengupta disclose the use of slurries of microencapsulated PCMs in thermal loops for heat transfer in systems which necessitate the use of more efficient thermal transfer fluids, such as systems in which large quantities of heat must be removed in short periods of time or systems in which there are system size restrictions which limit the volume of fluid which can be transported in the thermal loop. Such systems include lasers, electronic components, supercomputers, nuclear generators, etc.

U.S. Pat. No. 4,756,958 to Bryant discloses fibers and fabrics which incorporate microencapsulated PCMs. These materials exhibit enhanced thermal energy storage properties and can be manufactured into garments useful in extreme cold or extreme heat.

U.S. Pat. No. 4,513,053 discloses microencapsulating PCMs for incorporation into concrete or plastics.

The disclosures of the above-identified patents are incorporated herein by reference.

SUMMARY OF THE INVENTION

The present invention is directed to thermal energy storage compositions comprising macrocapsules containing therein a plurality of microcapsules and to methods for producing macrocapsules containing microcapsules. In accordance with some embodiments of the present invention, the microcapsules contain a phase change material.

In accordance with one embodiment of the present invention, a method for producing a macrocapsule containing a plurality of microcapsules therein comprises the steps of providing a plurality of microcapsules; suspending the plurality of microcapsules in a gelling agent solution thereby forming a suspension of microcapsules in the gelling agent. Suspension of adding the microcapsules as discrete drops to a crosslinking solution thereby crosslinking the gelling agent coating and forming discrete macrocapsules, and drying the macrocapsules.

Macrocapsules prepared in accordance with the present invention can be incorporated inside a coat, vest or other article for the purpose of absorbing body heat to increase the wearer's comfort level and thus to increase the length of time that the wearer can engage in a physical activity. The macroencapsulated phase change materials can be used in a variety of products such as firefighting garments, hazmat suits, specialized clothing for foundry workers, armed forces, etc.

The macrocapsules of the present invention may be used in any application relating to the transfer and/or storage of heat. Specific examples include, but are not limited to, the use of these materials in HVAC systems and construction materials for residential and commercial buildings, home furnishings and automobile upholstery, heat sinks for computers, etc.

The macrocapsules of the invention have a particle size in the range of 1000 to 10,000 microns with a PCM payload of at least 50%, more particularly at least 75% and in accordance with some embodiments at least 80%. Conventional type microcapsules in this size range based on the reservoir type core concept present production problems. These problems in production are obviated by macroencapsulating high concentrations of microencapsulated PCMs.

In accordance with the present invention, microcapsules containing PCMs are added to a gelling solution and mixed thoroughly. After mixing, the gel/microcapsule mixture is dripped into a crosslinking solution to form discrete gel droplets. The droplets are removed from the crosslinking solution, rinsed with water and dried to a consistency of less than 1% moisture to produce macrocapsules according to the present invention.

DETAILED DESCRIPTION OF THE INVENTION

The present invention is directed to thermal energy storage compositions comprising macrocapsules containing therein a plurality of microcapsules. In accordance with some embodiments of the present invention, the microcapsules contain a phase change material. By encapsulating microcapsules having a high payload of phase change material in larger macrocapsules, it is possible to produce thermal energy storage compositions having a relatively high payload of phase change material in the finished composition. Macrocapsules prepared in accordance with the present invention comprise a wall material formed by adding a slurry of microcapsules suspended in a gelling agent to a crosslinking solution wherein the crosslinking composition crosslinks the gel to form discrete gel droplets containing a plurality of microcapsules. The discrete gel droplets are separated from the crosslinking solution, rinsed with water and dried to a consistency of less than 1% moisture. The resulting thermal energy storage material may be incorporated into a number of articles including building materials, food serving trays, medical wraps, clothing or any applications where thermal energy storage materials are conventionally used.

Any of a variety of processes known in the art may be used to microencapsulate PCMs in accordance with the present invention. One of the most typical methods which may be used to microencapsulate a PCM is to disperse droplets of the molten PCM in an aqueous solution and to form walls around the droplets using techniques such as coacervation, interfacial polymerization and in situ polymerization all of which are well known in the art. For example, the methods are well known in the art to form gelatin capsules by coacervation, polyurethane or polyurea capsules by interfacial polymerization, and urea-formaldehyde, urea-resorcinol-formaldehyde, and melamine formaldehyde capsules by in situ polymerization. In accordance with particular embodiments of the present invention, the wall material for encapsulating PCMs is melamine-formaldehyde.

Generally speaking, phase change materials have the capability of absorbing or releasing thermal energy to reduce or eliminate heat transfer at the temperature stabilizing range of the particular temperature stabilizing material. The phase change material inhibits or stops the flow of thermal energy through the material during the time the phase change material is absorbing or releasing heat, typically during the material's change of phase. This action is transient, i.e., it will be effective as a barrier to thermal energy until the total latent heat of the temperature stabilizing materials is absorbed or released during the heating or cooling process. Thermal energy may be stored or removed from the phase change material, and can effectively be recharged by a source of heat or cold. Two or more different phase change materials can be used to address particular temperature ranges and such materials can be mixed.

PCMs useful in the invention include paraffinic hydrocarbons having 13 to 28 carbon atoms. For example, the melting point of a homologous series of paraffin hydrocarbons is directly related to the number of carbon atoms as shown in the following table:

| Compound Name | Number of Carbon Atoms | Melting Point (° C.) |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | -5.5 |

Additionally, crystalline materials such as 2,2-dimethyl-1,3-propanediol, 2-hydroxymethyl-2-methyl-1,3-propanediol, acids of straight or branched chain hydrocarbons such as eicosanoic acid and esters such as methyl palmitate, and fatty alcohols may be used as PCMs in the present invention. In fact, substantially any hydrophobic PCM which can be dispersed in water and microencapsulated by the technology referenced above may be useful in the present invention. Microcapsules containing octadecane are utilized in accordance with particular embodiments of the present invention.

The size of the microcapsules typically range from about 1 to 100 microns and more typically from about 2 to 50 microns. The capsule size selected will depend on the application in which the microencapsulated PCM is used. For use in heat transfer fluids, the capsule size may range from about 1 to 100 microns and more typically from about 2 to 40 microns.

The microcapsules will typically have a relatively high payload of phase change material, typically at least 70% by weight, more typically at least 80% by weight, and in accordance with some embodiments, the microcapsules may contain more than 90% phase change material.

Gelling agents useful in the present invention include polysaccharides, nonionic polymers, inorganic polymers, polyanions and polycations. Examples of polysaccharides useful in the present invention include, but are not limited to, alginate and natural ionic polysaccharides such as chitosan, gellan gum, xanthan gum, hyaluronic acid, heparin, pectin and carrageenan. Examples of ionically crosslinkable polyanions suitable for use in the practice of the present invention include, but are not limited to, polyacrylic acid and polymethacrylic acid. Ionically crosslinkable polycations such as polyethylene imine and polylysine are also suitable for use in the present invention. A specific example of a non-ionic polymer is polyvinylalcohol. Sodium silicates are examples of useful inorganic polymers.

The gelling agents are typically provided as an aqueous solution at a concentration and viscosity sufficient to provide the desired amount of coating on the microcapsules. The technology of macroencapsulation is known to those skilled in the art as is the routine optimization of these parameters for the gelling agent.

In accordance with one embodiment of the present invention, polysaccharide alginate serves as the gelling agent. Alginate as used herein refers to salts of alginic acid. A preferred alginate is manufactured by Grindsted, Inc. and is available commercially under the Tradename SOBALG-FD 120.

Preferably, the alginate is provided in a concentration range of 1% to 15% by weight. It should be appreciated, however, that varying amounts or concentration ranges of alginates in the final mixture may be utilized in order to carry out the invention.

The crosslinking solution typically comprises a material capable of crosslinking the gelling agent to form a crosslinked gelling agent. Typical crosslinking materials include multivalent ions, in particular cations. Cations useful in crosslinking the gelling agent include magnesium, calcium, zinc, barium, strontium, aluminum, iron, manganese, nickel, cobalt, copper, cadmium, lead, or mixtures of any 2 or more thereof. Calcium, barium, and strontium are useful in particular embodiments, with calcium being a particularly useful cation for crosslinking the gelling agent of the mixture. Calcium chloride is particularly useful and is available commercially from Ambar Manufacturing Co. The cationic crosslinking agent is used in an amount sufficient to crosslink the gelling agent as is known in the art.

Macrocapsules containing a plurality of microcapsules in accordance with the present invention are produced by providing a plurality of microcapsules; suspending the plurality of microcapsules in a gelling agent solution thereby forming a suspension of microcapsules in the gelling agent; adding the suspension of microcapsules as droplets of a desired size to a crosslinking solution thereby crosslinking the gelling agent around the microcapsules and forming discrete macrocapsules wherein each macrocapsule contains a plurality of microcapsules; removing the formed macrocapsules from the crosslinking solutions; rinsing the macrocapsules with water and drying to a consistency of less than 1% moisture.

Macrocapsules prepared in accordance with the present invention can range in particle size from 1000 to 10,000 microns with a PCM loading of at least 50%, more particularly at least 75%, and in some embodiments at least 80% weight.

The following non-limiting examples illustrate the preparation of macrocapsules in accordance with the present invention.

EXAMPLE 1

1) 10% alginate solution

Feather in 2.5 grams alginate into 22.5 grams of water while agitating with a lab stir motor equipped with a turbine blade.

2) 10% calcium chloride solution

Add 120 grams calcium chloride to 1080 grams water. Stir this solution to dissolve the calcium chloride using a laboratory stir motor equipped with a turbine blade.

3) Microcapsule slurry

PCM microcapsules 10–40µ, 88% payload (octadecane) commercially available from Microtek. Add 25 grams of dry microcapsules containing octadecane at an 88% core content to 75 ml deionized water. Stir the mixture using the stir motor/blade to thoroughly mix the components so that no lumps of the microcapsules are remaining.

4) Thoroughly mix the microcapsule slurry with the 10% alginate solution.

5) Slowly drip in the alginate/microcapsule mixture into the calcium chloride solution using a dropping funnel to regulate the flow of the alginate/microcapsule mixture. Slowly agitate the calcium chloride solution using a stir motor/blade to keep the droplets from agglomerating.

6) Remove the gelled droplets from the calcium chloride solution, rinse with water and dry in an oven to a dryness of <1% moisture.

The size of the finished product is an average of 3440 microns. The moisture content was 0.88%. The theoretical wax content of the particles was approximately 75 to 80%.

Calcium oxide dissolved in a solution of hydrochloric acid will also be effective as a crosslinking salt solution. The microencapsulated phase change material can be added as a wet cake instead of as a dry powder. Several other concentrations of alginate, calcium chloride and microcapsules can be utilized. The size of the microencapsulated phase change material can also be varied as well as the PCM content.

EXAMPLE 2

Polyvinyl Alcohol—Sodium Tetraborate System

Solution #1–15 grams sodium tetra borate dissolved in 300 ml DI water (the solution was saturated with some undissolved borate)

Solutions #2–3 grams polyvinyl alcohol (PVA) dissolved in 27 ml DI water (10% solution) Grade 540 from Air Products Company 54.1 grams of wet cake (53.9% solids) of microencapsulated PCM wax.

Thoroughly mixed the microcapsules with the solution 1 and dripped the resulting slurry into solution 2 that was agitated using a variable speed stir motor and turbine. The resulting rubbery beads were removed from the solution 1 container and allowed to dry overnight. Some of the resulting soft beads were placed into a beaker containing isopropyl alcohol to enhance the drying of the large droplets. The droplets from the isopropyl alcohol were then also dried overnight.

EXAMPLE 3

Sodium Silicate

50 Grams Silicate of Soda (~57% Solids) obtained from Chem Services and 50 grams of a water wet filter cake containing about 60% by weight microencapsulated technical grade Octadecane were mixed well. Using a disposable pipette, the mixture was dripped a drop at a time, into a saturated solution of magnesium sulfate (Epsom Salts) with slow agitation. Beads of approximately 3 to 4 mm in diameter were formed as soon as the droplets entered the salt solution. They were isolated by filtering and dried on the bench top. The round beads thus formed contained about 50% technical grade Octadecane.

EXAMPLE 4

Gelatin Gluteraldehyde—Alum System 10 grams of 300 Bloom pork skin gelatin were dissolved in 90 grams of deionized water using agitation and heat in a 150 ml beaker. 10 grams of the solution were removed to which 5 grams of water and 10 grams of microencapsulated PCM were added. The resulting slurry was stirred until well dispersed. 100 ml of saturated alum (aluminum sulfate) solution were poured into a 400 ml beaker and 2 grams of 50% gluteraldehyde solution were added, with agitation. Continued the agitation and added drop-wise the gelatin slurry to the alum solution, thus forming large droplets that can be dried to form hard beads (macrocapsules) containing microencapsulated phase change material.

What is claimed is:

1. A thermal energy storage composition comprising macrocapsules containing therein a plurality of microcapsules wherein said microcapsules contain a phase change material.

2. The thermal energy storage composition of claim 1 wherein said macrocapsules have a payload of at least 50% phase change material by weight.

3. The thermal energy storage composition of claim 2 wherein said macrocapsules have a payload of at least 75% phase change material by weight.

4. The thermal energy storage composition of claim 3 wherein said macrocapsules have a payload of at least 80% phase change material by weight.

5. The thermal energy storage composition of claim 1 wherein said macrocapsules have a particle size of from about 1000 to 10,000 microns.

6. The thermal energy storage composition of claim 4 wherein said macrocapsules have a particle size of from about 1000 to 10,000 microns.

7. The thermal energy storage composition of claim 1 wherein said phase change material is a paraffin hydrocarbon selected from the group consisting of: n-Octacosane, n-Heptacosane, n-Hexacosane, n-Pentacosane, n-Tetracosane, n-Tricosane, n-Docosane, n-Homeiocosane, n-Eicosane, n-Nonadecane, n-Octadecane, n-Heptadecane, n-Hexadecane, n-Pentadecane, n-Tetradecane, n-Tridecane, and combinations thereof.

8. The thermal energy storage composition of claim 7 wherein said phase change material comprises n-Octadecane.

9. The thermal energy storage composition of claim 1 wherein said microcapsules have an average particle size of from about 2 to 50 microns.

10. The thermal energy storage composition of claim 1 wherein said macrocapsule comprises a crosslinked gelling agent.

11. The thermal energy storage composition of claim 10 wherein said crosslinked gelling agent is selected from the group consisting of alginate, polyvinyl alcohol, sodium silicate and gelatin.

12. The thermal energy composition of claim 1 wherein said energy storage composition is incorporated inside a coat, vest or other article of clothing.

13. The thermal energy storage composition of claim 1 wherein said composition is incorporated into construction materials, home furnishings, automobile upholstery, or heat sinks.

* * * * *